J. G. KAPPLER & J. GAINES.
COTTON OIL MILL SEED HULLER.
APPLICATION FILED JAN. 25, 1909.

948,508.

Patented Feb. 8, 1910.

2 SHEETS—SHEET 1.

Witnesses:

Inventors,
John G. Kappler and
John Gaines,

J. G. KAPPLER & J. GAINES.
COTTON OIL MILL SEED HULLER.
APPLICATION FILED JAN. 25, 1909.
948,508.
Patented Feb. 8, 1910.
2 SHEETS—SHEET 2.
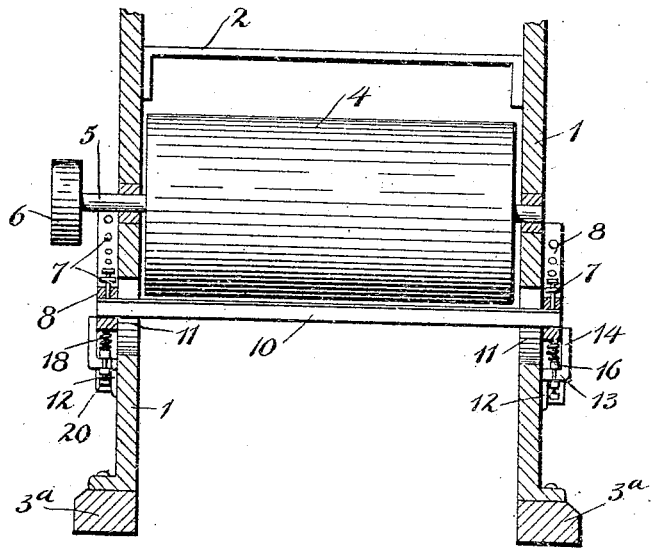
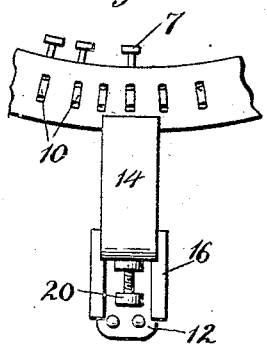
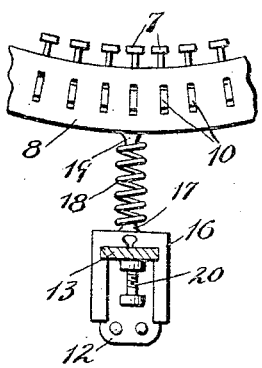
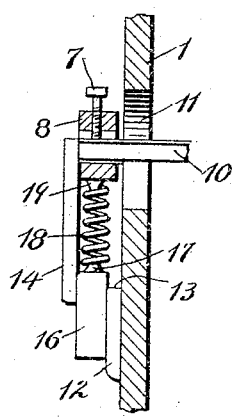
Witnesses:
Inventors
John G. Kappler and
John Gaines,
by John M. Speelman
Atty.

UNITED STATES PATENT OFFICE.

JOHN G. KAPPLER AND JOHN GAINES, OF GIDDINGS, TEXAS.

COTTON-OIL-MILL SEED-HULLER.

948,508.  Specification of Letters Patent.  Patented Feb. 8, 1910.

Application filed January 25, 1909. Serial No. 473,981.

*To all whom it may concern:*

Be it known that we, JOHN G. KAPPLER and JOHN GAINES, citizens of the United States, residing at Giddings, in the county of Lee and State of Texas, have invented certain new and useful Improvements in Cotton-Oil-Mill Seed-Hullers, of which the following is a specification.

Our invention relates to new and useful improvements in cotton oil mill seed hullers.

The object of the invention is to provide a resiliently supported secondary frame which will prevent the breaking or "drilling" of the knives by foreign matter.

A further feature resides in the provision of sliding clamps, or supports arranged to be adjusted.

Finally, the object of our invention is to provide a device of the character described that will be strong, durable, efficient and simple, and comparatively inexpensive to construct; also one in which the several parts will not be liable to get out of working order.

Figure 1:
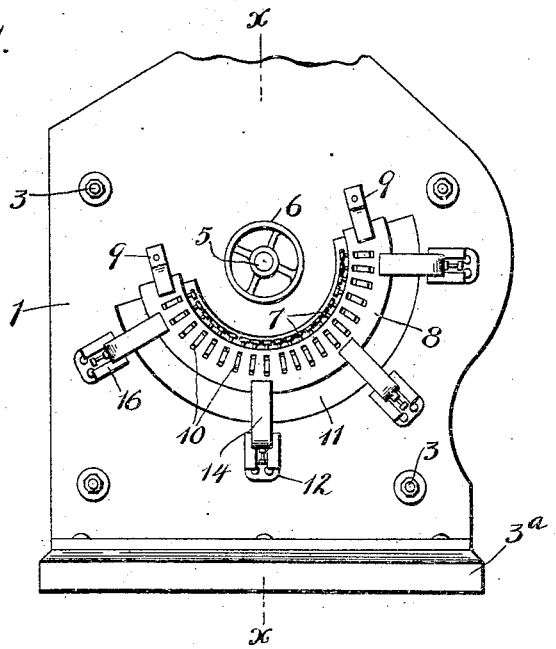
Figure 2:
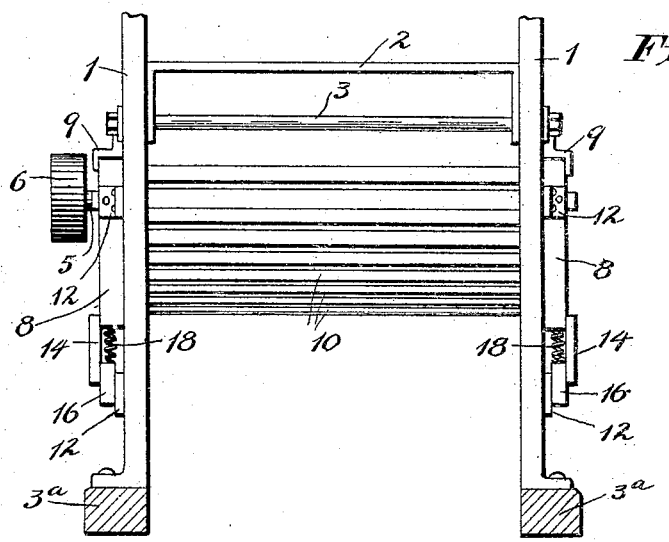

With the above and other objects in view, our invention has particular relation to certain novel features of construction and operation, an example of which is described in the following specification, set forth in the claims and illustrated in the accompanying drawing, wherein:

Figure 1 is a side elevation of the seed huller, equipped with our invention; Fig. 2 is an end elevation; Fig. 3 is a transverse, vertical, sectional view of the seed huller, taken on the line $x$—$x$ of Fig. 1. Fig. 4 is a detail of one of the brackets and a portion of the frame; Fig. 5 is a similar view, showing a portion of the bracket in section; and Fig. 6 is a detail in vertical section, showing a portion of the secondary frame and its supporting means.

In the drawings the numeral 1 designates the side plates of the seed huller, which are spaced apart by end plates 2 and held together by rods 3. These plates are securely mounted on sills 3ª. Between the plates a drum 4 is mounted on a shaft 5, projecting through one of the plates and having a pulley 6 on its projecting end. In each plate below the shaft a segmental slot 11 is formed, which slots conform in a general way to the contour of the drum.

A secondary frame is formed by segmental frame plates 8, associated with the slots 11 on the outer sides of the main frame plates 1, and transverse knives 10 having their ends adjustably held in the segmental plates by set screws 7. This secondary frame conforms generally to the contour of the drum 4, and forms a grate or bed thereunder. The primary object of our invention is to yieldably and adjustably support this secondary frame. The slots 11 permit a vertical movement of the frame; while keepers 9 secured to the outer sides of the plates 1 at the ends of slots 11 guide the frame in its vertical movement and hold it against lateral displacement.

Off-set brackets 12 disposed in radial relation to the drum are secured on the outer sides of the main frame plates 1, just below the segmental slots. Each bracket is formed with a horizontal shoulder or seat 13 from which a guard 14 extends upward on the outside of the segmental plate. These guards acting in conjunction with the keepers 9 hold the secondary frame against lateral displacement. The shoulder or seat 13 of each bracket is notched as indicated at 15 in Fig. 5 to receive and guide an inverted U-shaped supporting member 16, provided on its side with a central boss 17 receiving the lower end of a coiled spring 18, which is engaged around a similar boss 19 on the under edge of the segmental plate. In this way the segmental plate on each side is yieldably supported, the secondary frame consequently being cushioned.

An adjusted screw 20 is threaded through each shoulder from the under side, bearing against the supporting member. It is evident that by adjusting these screws the supporting members are raised or lowered, and the secondary frame adjusted vertically.

The operative relation of the knives and the drum may be readily controlled by the adjustment of the secondary frame. By yieldably mounting the secondary frame, the knives are protected. Where the knives are rigidly mounted, a piece of hard substance or other foreign matter entering the seed huller and passing between the drum and knives, would either break the knives or mar the edges of same and otherwise injure and impair the seed huller. In seed hullers equipped with our invention this can not occur, as the knives being mounted in a resiliently supported frame will yield and will permit the substance to pass out of the seed huller without injuring any of the parts of the seed huller. It will also be noted that all the parts are readily accessible for inspection, cleaning, removal and replacement.

What we claim is:

1. In a cotton seed huller, a frame comprising side plates having segmental slots therein, a drum mounted between the side plates, and a plurality of knives arranged to coöperate with said drum, in combination with a freely mounted frame carrying said knives having portions extending through the segmental slots in the side plates, and means in engagement with the said protecting portions for yieldably adjusting the knife carrying frame.

2. In a cotton seed huller, a frame comprising side plates having segmental slots therein, a drum mounted between the side plates, and a plurality of knives arranged to coöperate with said drum, in combination with a frame carrying said knives having portions extending through the segmental slots in the side plates, and means in engagement with the said protecting portions for adjusting the knife carrying frame, said means including resilient bearings for the frame supported on the outside of the side plates.

3. In a cotton seed huller, a drum, a frame, a series of knives carried by said frame arranged to coöperate with the drum, a support comprising side plates having slots through which said frame projects in a direction axially of the drum, and means supported on the side plates engaging the projecting portions for adjusting said frame and knives.

4. In a cotton seed huller, a drum, a frame, a series of knives carried by said frame arranged to coöperate with the drum, a support comprising side plates having slots through which said frame projects in a direction axially of the drum, and means supported on the side plates engaging the projecting portions for yieldably adjusting said frame and knives.

5. In a cotton seed huller, a knife carrying frame, side plates having slots through which members of said frame project and are freely movable, means mounted on the side plates engaging said projecting portions for yieldably supporting the same, and means for adjusting the pressure of said last mentioned means.

6. In a cotton seed huller, a knife carrying frame, a support having side plates, and means for yieldably supporting the knife carrying frame comprising a bracket 14 on one surface of one of said plates, a stirrup 16 straddling said bracket, and a spring interposed between the stirrup and the knife carrying frame.

7. In a cotton seed huller, a knife carrying frame, means for yieldably supporting the same comprising a bracket 14, a stirrup 16 thereon, a spring interposed between the stirrup and the knife carrying frame, and adjusting means between the bracket and the stirrup for regulating the pressure of the spring.

8. In a machine of the character described, an operating member, a frame, a series of devices adapted to coöperate with said operating member carried by said frame, a support comprising side members having openings through which said frame projects in a direction longitudinally of the operating member, and means supported on the side plates engaging the end portions of the frame for adjusting said devices.

9. In a cotton seed huller, a segmental knife carrying frame, means for adjustably supporting the same including brackets 14 having elongated portions constituting guides overlapping the sides of the frame, and stops 9 overlapping the ends of the frame.

In testimony whereof we have signed our names to this specification in the presence of two subscribing witnesses.

JOHN G. KAPPLER.
JOHN GAINES.

Witnesses:
RICHARD W. MAYFELD,
A. J. NISBET.